June 13, 1961  E. E. HARDESTY  2,988,240
LINED PRESSURE VESSEL
Filed Oct. 14, 1958
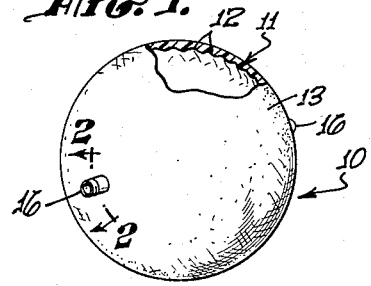
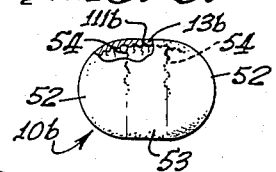
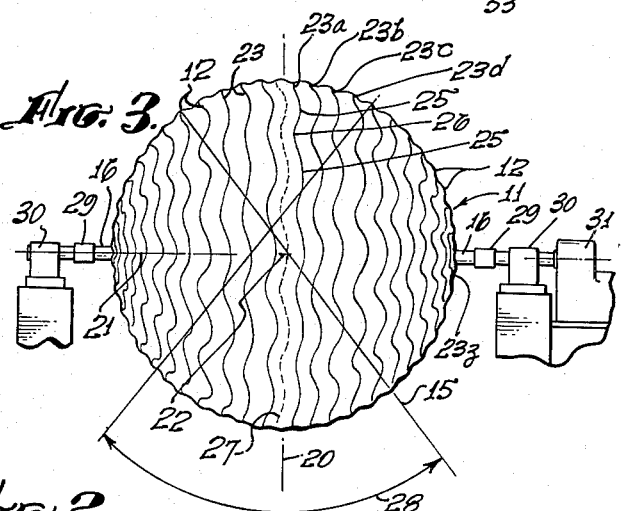
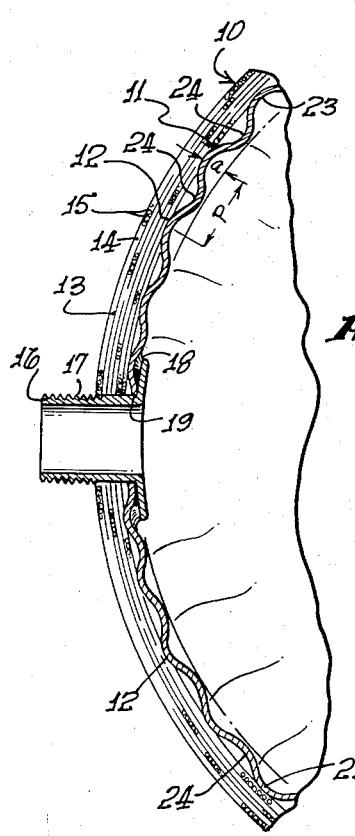
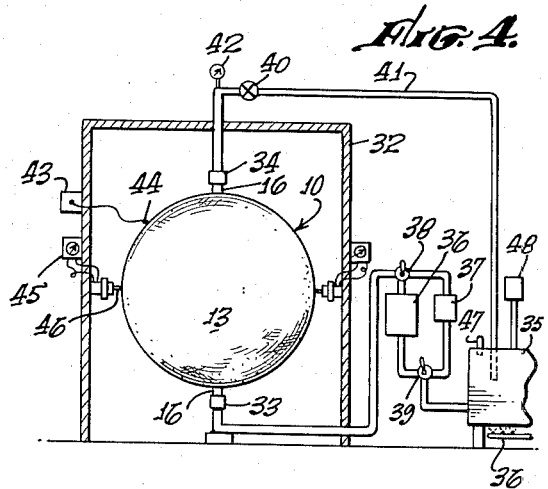
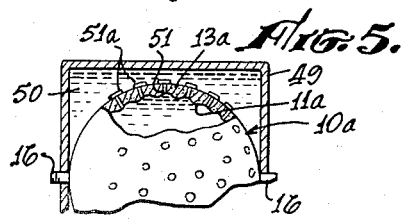
ETHRIDGE E. HARDESTY,
INVENTOR.
BY William P. Green
ATTORNEY.

2,988,240
LINED PRESSURE VESSEL
Ethridge E. Hardesty, 1921 Maple, Costa Mesa, Calif., assignor of one-half to Ralph E. Lazarus, Los Angeles, Calif., as trustee
Filed Oct. 14, 1958, Ser. No. 767,129
15 Claims. (Cl. 220—3)

This invention relates to an improved type of vessel for containing a fluid under high pressure.

There are certain types of fluid systems in which a liquid or gas must be contained under very high pressure, and yet in which it is extremely important that the vessel or chamber for holding the fluid be as light in weight as possible. This is particularly true in the case of fluid tanks for missiles, or for other airborne installations in which weight must necessarily be kept to an absolute minimum. The vessels of the present invention have been specifically designed for this type of use.

A vessel embodying the invention is formed of an inner liner of fluid impervious material, and an outer layer of material extending about the liner and supplying strength to prevent rupture of the liner by the pressure of the contained fluid. The inner liner may be made of any of various materials, but in many instances is preferably formed of a thin sheet metal. The outer layer also might possibly be formed of various different materials, but in the preferred embodiment is formed of a binder (desirably a resinous plastic material) having a filament-form reinforcing material embedded therein.

In a vessel of the above discussed character, formed of a thin liner of metal or the like within an outer layer of reinforced resin or other material, considerable difficulty may be encountered in use by reason of the inability of the inner liner to expand and contract with the outer layer without damage to the liner. As the internal pressure within such a vessel increases to a very high value, say to about 5000 p.s.i. in the case of a missile fluid cell, the entire vessel will necessarily expand slightly under the influence of that pressure. The reinforced resin outer layer normally has a lower modulus of elasticity in tension than the metal of the liner, and will therefore tend to expand more. As the thin walled metal liner then expands with the outer layer, the metal of the liner may be forced to stretch beyond its elastic limit, and thus be permanently deformed to a condition from which it will never return upon release of the internal pressure. Similarly, an excessive increase or decrease in temperature may cause expansion or contraction of the outer layer to an extent deforming the liner beyond its elastic limit.

The general object of the present invention is to provide a lined vessel of this general type in which the inner liner is so designed as to positively prevent its distortion beyond its elastic limit under the influence of pressure and temperature changes which may be encountered in use. For this purpose, the inner liner is specially constructed to give it an increased range of expansibility and contractibility within its elastic range. More specifically, the liner is deformed to a condition in which its wall has a slight waving configuration, so that upon expansion of the liner, the waves may tend to straighten out and thus allow for a substantial amount of expansion without actual stretching of the metal or other material of the liner. Preferably, the individual peaks and valleys of the waves in the liner wall also have a secondary waving curvature as they extend transversely of the direction of advancement of the waves, to thereby prevent the liner from forming a non-waving constricting band about the vessel at any point.

To assure optimum strength characteristics in the vessel, it is best in many instances to form the vessel of spherical configuration, though it is contemplated that the waving wall principle may if desired be applied to cylindrical vessels and other non-spherical shapes. Certain additional features of the invention have to do with a preferred arrangement and proportioning of the waves when the vessel is of such spherical shape. Other features of considerable importance reside in the provision of means for assuring effective heat transfer through the wall of the vessel, and particularly through the resinous outer layer, which would normally conduct heat very poorly. More specifically, this result is achieved by providing heat conductive pins or elements which extend outwardly from the liner and through the resinous layer to the outside of that layer. These pins may typically be formed of aluminum or other highly heat conductive metal, and may be welded or soldered at their inner ends to the metal liner.

The above and other features and objects of the present invention will be better understood from the following detailed description of the typical embodiments illustrated in the accompanying drawing in which:

FIG. 1 is a perspective view, partially broken away, of a completed pressure vessel embodying the invention;

FIG. 2 is an enlarged fragmentary section through the FIG. 1 vessel, taken at the location of one of its pressure connections, and showing the wave form deformations or corrugations of the inner liner in greatly exaggerated form, to facilitate understanding of the configuration of the liner;

FIG. 3 represents diagrammatically the manner in which a resin coated filament or a group of filaments are wound onto the liner of the FIG. 1 pressure vessel;

FIG. 4 represents the apparatus for curing the resin in the outer layer of the pressure vessel;

FIG. 5 is a fragmentary perspective view, partially broken away, showing a variational form of the invention; and FIG. 6 is a view showing another variational form of the invention.

Referring first to FIGS. 1 and 2, there is shown in these figures a spherical pressure vessel 10 which is constructed in accordance with the invention, and which may typically be a tank for holding a gas or liquid within a missile at an extremely high pressure, for example in the order of about 5000 pounds per square inch. This pressure vessel 10 has an inner spherical liner 11, which is formed of a material having considerable stiffness or rigidity, so that the liner will effectively retain its illustrated normal shape or configuration during and after formation of the vessel, except when relatively high pressures are applied to the interior of the vessel during its manufacture or subsequent use. To allow for some radial expansion of the liner 11 under the influence of such high internal pressures, the liner wall is deformed to have a large number of deformations or corrugations 12, whose configuration will be discussed in greater detail at a later point. About the outside of liner 11, there is provided an outer layer of material 13, formed of a resinous plastic material 14 having a reinforcing filament or filaments 15 embedded therein. At an appropriate location or locations, the vessel 10 has one or more radially outwardly projecting pressure fittings or connections 16, which are tubular and are threaded (typically externally) at 17 for attachment to mating pressure fittings through which pressure fluid is conducted into and out of the vessel when in use. Preferably, two of the connections 16 are provided on liner 11 at two diametrically opposite locations. At their inner ends, these pressure connections 16 are annularly welded or otherwise rigidly secured at 18, in fluid tight sealing relation, to the inner shell 11, which has an opening 19 at the location of each fitting 16 for passing fluid into and out of the pressure vessel.

In manufacturing vessel 10, the first step may be to form the inner liner 11 of a suitable material, and to apply the pressure fittings 16 thereto. For many uses, it is desirable that liner 11 be formed of a rigid metal, which is effectively bonded to the outer layer 13 continuously over the surface of liner 11, so that liner 11 is an integral part of the ultimate pressure vessel 10. In this instance, the inner liner 11 is formed of a material which is impervious to the gas or liquid which is to be contained in vessel 10, so that the metal effectively prevents the leakage of any of the fluid of the vessel through its walls. For some uses, the liner 11 may be formed of steel, while in other situations, in which the attainment of minimum weight is of extreme importance, the inner liner may be formed of aluminum or other very light metal. The thickness of the liner wall may typically be between about .015 and .125 inch, preferably about .025 inch where the vessel is to retain pressures up to about 5000 pounds per square inch, and where the liner is formed of steel or aluminum.

To now describe more specifically the preferred configuration of the wave like deformations or corrugations 12 in line 11, it should be clear first of all be made clear that these corrugations are actually of very small amplitude in most instances, usually being so slight as to be almost imperceptible. Since an actual scale drawing of these corrugations would not convey the idea of the invention well at all, the size of the corrugations has been multiplied many times in the drawing, in order to facilitate an actual understanding of the invention from the drawing.

In discussing the particular arrangement of corrugations which is shown in FIGS. 1 to 3, it is helpful to consider the two pressure fittings 16 as being located at two diametrically opposite pole positions, with respect to sphere 11, and it is also helpful to refer, in discussing the corrugations, to a transverse equator plane 20, which extends transversely of the main polar axis 21 through fittings 16, and which extends through the center 22 of the sphere. As the wall of liner 11 advances from the equator location 20 toward the opposite pole locations, the liner wall alternately waves radially inwardly and then radially outwardly, as seen very clearly in FIG. 2, to form the discussed corrugations 12. The maximum diameter "peak" portions of the waves 12 are represented in FIG. 3 by the waving lines of that figure. As will be understood from FIG. 3, these peaks 23 of the waves are elongated or extended transversely of the direction of advancement of the wave form (that direction of advancement being from equator 20 to poles 16), so that each of the peak portions 23 extends generally annularly entirely about sphere 11. Similarly, each of the valleys 24 of the wave form also extends generally annularly and continuously about the sphere 11. In thus extending about liner 11, each of the peaks 23, and valleys 24, as well as the intermediate portions of the wave form, has a secondary waving configuration, which is desirably sinusoidal, and which will be apparent from the showing of FIG. 3. Consider for example the particular wave peak which has been designated 23a in FIG. 3, and which is closely adjacent the equator plane 20. As this peak line 23a advances circularly about the periphery of sphere 11, and essentially along its equator, peak 23 first advances axially toward one of the poles and to a location 25, following which the line 23a returns toward the opposite pole to a location 26, to then again reverse its curvature toward another location 25, etc. for the entire circular distance about the sphere. The next successive peak 23b has a sinusoidal curvature parallel to peak 23a and extending entirely about the sphere, but at all points spaced a predetermined distance from line 23a in a direction toward one of the poles 16. Similarly, the other peak lines 23c, 23d, etc. are spaced progressively toward pole 16, but all have the same sinusoidal curvature discussed in connection with line 23a. Also, the valleys 24 between successive peaks 23a, 23b, 23c, etc. of course have the same sinusoidal curvature, first curving toward one of the poles, and then back toward the other pole or the equator. These parallel sinusoidally waving peaks and valleys are the same at both sides of the equator line 20, and as they approach the two pole locations 16, the successive peaks 23 and valleys 24 are of progressively decreasing length about the sphere. The final peak 23z adjacent each of the pole fittings 16 is of course very short circularly, since it extends about fitting 16 in close proximity thereto. Liner 11 may be formed of two separately made essentially hemispherical parts, which are welded or otherwise securely joined together in fluid tight relation along the dotted line 27 of FIG. 3. This dotted line 27 may follow along, and curve sinusoidally in correspondence with a central one of the valleys 24, between two of the peaks 23 which are nearest equator location 20.

As the wave form represented in FIG. 2 progressively advances from equator location 20 to one of the pole fittings 16, it is preferred that the amplitude $a$ of successive waves (that is, the distance radially of the sphere between a valley location and a peak location) progressively decrease toward the pole. Also, it is preferred that the pitch distance P between successive peaks progressively decrease as the liner advances from the equator to each pole. For optimum results, it is best that the decrease in amplitude $a$ and in pitch P be substantially proportional to one another, and also both should be substantially proportional to the decrease in peripheral or circular length of the successive peaks 23 and valleys 24 as they advance toward the pole locations. The basic wave form, as seen in FIG. 2, may be defined as essentially a sinusoidal wave, but of progressively decreasing amplitude.

For most uses to which the present invention is adapted, I find it desirable that the maximum amplitude $a$ of the wave form be not more than about .040 in., the amplitudes typically varying within a range between about .008 in. and .125 in. Also, the different pitch distances P between successive peaks may fall within a range between about .75 in. and 4.50 in.

After the inner liner 11 has been formed, and its pressure connections 16 have been attached to the liner, that part is then covered externally by the material which is to ultimately form the outer resinous layer 13. This material is preferably applied by first coating a filament or group of filaments 15 of the reinforcing material with the resin 14 in uncured state, and then by winding this coated filament or group of filaments 15 onto the outer surface of liner 11. The filament 15 may for most uses be formed of glass, which may be in the form of either "yarn," a ribbon formed of a group of unidirectional filaments loosely held together in ribbon form, or a "roving," the latter being preferred. As used in this specification, the term "roving" refers to a strand composed of a plurality of substantially parallel, continuous, unspun filaments of glass or other material. Such a roving, or bundle of glass filaments, may contain any desired number of individual strands, say from about 10 "ends" up to about 100 or more.

Instead of glass, it is possible also to ultilize any of various other materials for the filament 15, such as steel "piano wire," thin metal strip or ribbon (e.g. steel or aluminum), or such synthetic fibers as rayon, nylon, acrylic fibers, polyester fibers, or saponified regenerated cellulose. In some cases, a combination of strands of two or more different materials, such as steel "piano wire" and glass fibers, may be wound onto the inner shell 11, so that the increased modulus of elasticity of one of the materials (the wire) may raise the resultant overall modulus to a desired value. Where steel wire is employed, it may typically have a diameter between about .0005 and .005 inch, and where glass filaments are employed, they may typically be of a size to require about 15,000 yards per pound.

Referring now to FIG. 3, the strand 15 may be applied to the outer surface of inner liner 11 by continuously turning the liner about the diametrical axis 21, and by simultaneously swinging either the liner 11 or the filament feeding means (not shown) about an axis which extends through the center 22 of the sphere, and is perpendicular to axis 21 and to the plane of the paper in FIG. 3. This swinging motion is typically first in one rotary direction for about 80° and then in the reverse rotary direction for about 80° (as represented by arrow 28 in FIG. 3). Various "filament winding machines" have been designed in the past for thus winding a filament onto a sphere, and consequently no attempt will be made in the present application to describe specifically any one of these devices. One such machine is shown in Trevaskis et al. Patent Number 3,788,836, issued April 16, 1957 for "Method and Apparatus For Making Air Pressure Containers." In FIG. 3, the filament winding apparatus has been shown only partially and very diagrammatically, as including a pair of mounting elements or fittings 29 threaded onto the two fittings 16, and journaled in suitable bearings 30 for rotation about axis 21. One of these fittings 29 may be continuously driven by a motor 31, suitably geared to turn sphere 11 at a proper speed. In FIG. 3, it may be assumed that the strand 15 is fed to the sphere by hand, or by any suitable feeding apparatus, with resin being applied to the strand before it reaches the sphere. The strand feeding apparatus, or the operator's hands where manual feeding is employed, are moved back and forth relative to the sphere, and as indicated by arrow 28, so that each turn of the filament about the sphere is substantially annular, and extends about the sphere at a point of greatest circumference. That is, the filament is at every point substantially tangent to the sphere, but this tangential point is constantly moving, thereby building up an outer shell in which all fibrous tension members are acting as individual constricting bands. They are also lying omnidirectional to each other, and therefore parallel to any and all lines of peripheral tension caused by the application of internal pressure.

After the filament 15 has been wound onto core 11 to a sufficient thickness to give the ultimate pressure container 10 the desired strength, preferably to a thickness several times as great as the thickness of the inner liner 11, the resin of the outer layer is cured to a hardened condition. Preferably, this curing operation is performed in accordance with the teachings of my co-pending application Serial Number 738,878, filed May 29, 1958, on "Formation of a Pressure Vessel." The apparatus which may be utilized for this curing operation is shown somewhat diagrammatically in FIG. 4, and includes suitable means for supporting the wound sphere 10 within a preferably explosion proof outer housing 32, as by means of an upstanding bottom fluid inlet fitting or column 33 connected to one of the fittings 16 of the sphere, and an upper fluid outlet fitting 34 attached to the other fitting 16. Any suitable type of sealed joints may be utilized for detachably but rigidly connecting fittings 16 of the sphere to the fluid inlet and outlet lines 33 and 34.

During a curing operation, a heated pressurizing liquid is fed to the interior of sphere 10 through inlet line 33, from a supply tank represented at 35, which is heated in some manner, as by a burner represented at 36. From tank 35, the pressure fluid may be pumped into the sphere by either of two pumps 36 and 37, the former of which is a large volume low pressure pump, while the latter is a small volume but very high pressure pump. Two three way valves 38 and 39 are actuable to selectively connect either of the two pumps into the fluid supply line. Fluid from discharge fitting 34 flows through a control valve 40 and then through a line 41 back to heated closed tank 35. The valve 40 is actuable to any of different settings, to vary the restriction offered thereby to flow of fluid into line 41, or to completely close off that flow if desired. Preferably, the heated liquid which is circulated from tank 35 is water, and the pressure of the water within sphere 10 at a particular instant may be indicated by a gauge 42 at the inlet side of valve 40. The temperature of the reinforced resinous layer 13 may be indicated at the outside of housing 32 by an indicator 43 connected to a thermo-couple 44. Also, the extent to which the sphere is expanded by internal pressure during curing may be shown at the outside of the housing on one or more indicators 45 which are actuated by transducers 46 engaging the outer surface of the sphere.

The resin 14 which completely coats and covers filament or roving 15 should be of a thermo-setting type adapted to be cured by heat to a hardened and polymerized state. For this purpose, I may utilize any of various thermo-setting resins, preferably selected from the class of resins consisting of the epoxide, phenolic, silicone (organopolysiloxanes), polyurethane, and polyester resins. All of these are curable to a substantially infusible and insoluble state, in which they very effectively bind the different turns of strand 15 in substantially fixed relative positions, so that the outer layer 13 is a very strong and pressure resistant part of the overall structure.

To now describe a complete process of manufacturing a pressure vessel such as that shown in FIGS. 1 and 2, the first step is of course to form the inner corrugated liner 11, with its pressure connections 16, following which the resin coated filament 15 is wound onto the liner as discussed above in connection with FIG. 3. The wound sphere is then mounted in the apparatus of FIG. 4, and three way valves 38 and 39 are turned to positions in which only the pump 36 is connected into the line between tank 35 and line 33 leading to the sphere. Burner 36 is placed in operation until the water or other fluid within tank 35 has been raised to a temperature which is considerably above the normal ambient temperatures, but is low enough to prevent vaporization of the pressure fluid when it enters sphere 10. Where water is utilized as the pressure fluid, it may initially be at a temperature of about 200° F. The motor driven pump 36 is placed in operation to pump heated fluid from tank 35 into sphere 10, to thereby heat liner 11, and through it to commence the curing of the resin in outer layer 13. During the initial filling of sphere 10 with fluid from tank 35, control valve 40 is left open, so that any air that is within sphere 10 can be discharged through upper outlet 34 back to the tank, from which it may be vented to the atmosphere through a typically manually actuated vent valve 47. After the pump 36 has completely filled sphere 10, the pump is allowed to continue recirculating the heated fluid through the sphere and back through line 41 to tank 35, until the temperature of vessel 10 is raised to a point just sufficient to start the impregnating resin of layer 13 to flow. This temperature will of course be a different temperature for each of the various resins which may be employed, but the temperature will be known for a particular resin, and will be indicated by unit 43 at the outside of housing 32.

When the uncured resin of layer 13 begins to soften or reflow, valves 38 and 39 are turned to positions in which the high pressure pump 37 is connected into the circulating line, rather than low pressure pump 36. Valve 40 is then closed to a certain extent, so that pump 37 will commence to raise the pressure within shell 10. From that point forward, the operator progressively closes or restricts valve 40, to progressively increase the internal pressure within sphere 10 at a rate commensurate with, and substantially proportional to, the curing rate of the particular resin being used. Also, as the pressure within the liner is increased, burner 36 is operated to progressively increase the temperature of the water or other fluid, until the vessel 10 has reached a temperature at which the resin will completely cure.

The internal pressurization of sphere 10 causes inner liner 11 to expand radially outwardly in a manner compacting the resin and filament components of outer layer 13, and prestressing that layer, and particularly its filaments, so that when the pressure vessel is subsequently placed under internal pressure when in use, the tendency for stretching or relative movement of the filaments and resin will be minimized. Thus, the overall strength of the outer layer 12, and consequently of the entire sphere, is vastly increased. The indications given by units 45 at the outside of housing 34 allow an operator to all times keep the entire pressurizing portion of the process under control, so that the pressure is not at any time allowed to become great enough to expand the sphere beyond a predetermined point. After the curing process has been completed, as shown by the attainment of a predetermined temperature indication on unit 43, and with the internal pressure within sphere 10 then at a maximum value, valve 40 is completely closed, and pump 37 is stopped, while the vessel is allowed to gradually cool. During this cooling period, the very high internal pressure is maintained, and if necessary pump 37 may be operated for short intervals, to keep the pressure within sphere 10 at the desired highest value. The maximum temperature of the water or other liquid within sphere 10 is such as to assure complete curing of the resin. For the particular resins which have been mentioned previously, the liquid should preferably be about 370° F. during the final portion of the curing process. For most of the uses for which a pressure vessel of the present type is intended, the maximum internal pressure attained within sphere 10 during the curing process should be at least about 1500 pounds per square inch above the external pressure, preferably between about 3000 and 6000 pounds per square inch. Tank 35 should of course be a sufficient size to hold as much liquid as may be required in the entire system during the pressurizing operation. Also, suitable means (such as pump 48—see FIG. 4) may be provided for supplying makeup water or other fluid to tank 35 as needed.

When the sphere 10 is internally pressurized during curing, the expansion of the sphere by the internal pressure causes the corrugations or waves 12 in liner 11 to be straightened out or reduced in amplitude considerably, preferably to a condition in which the wall of liner 11 is substantially exactly spherical, with no corrugations at all. The material of which the liner is made desirably is a resilient material, which normally tends to return to its illustrated corrugated condition, when the internal pressure within the sphere is relieved. When the filament form reinforcing material 15 is wound onto the liner 11, the filaments tend to bridge over the valleys between adjacent peaks 23 of the waves or corrugations, in the manner shown in FIG. 2. Upon curing, the resin bonds tightly to the outer surface of liner 11, at all points at which the resin contacts that surface, to form a well integrated overall sphere structure.

When the sphere 10 is placed in use, fittings 16 may be connected to suitable pressure fluid inlet and outlet lines, and the sphere 10 may be subjected to a very high internal fluid pressure. Such internal pressure expands the sphere 10 slightly, to again straighten out the corrugations of liner 11, and with most of the load being taken by the outer reinforced resin layer 13 of the sphere. The modulus of elasticity of outer layer 13 is such that this layer will expand through a rather substantial distance in response to the high pressures for which the vessel 10 is designed. One of the major purposes for providing the corrugations 12 in liner 11 is to give the liner a capacity for similar expansion radially outwardly under the influence of internal pressure, so that the liner does not reach its elastic limit within the range of expansion required for layer 13. As will be apparent, liner 11 does not normally have sufficient strength to itself withstand the expanding forces, since most of those forces are intended to be taken by the outer layer 13. Another reason for providing the corrugations in liner 11 results from the fact that the resinous outer layer usually tends to expand and contract more in response to temperature changes than would a true spherical liner. The corrugations in liner 11 allow that liner to expand and contract very freely with outer layer 13, in response to temperature changes, without any danger of reaching or exceeding the elastic limit of the liner.

FIG. 5 represents a pressure tank installation which utilizes a variational form of sphere 10a embodying the invention. This sphere 10a is especially designed to allow for relatively rapid transfer of heat through the spherical sidewall of the vessel, while at the same time attaining also the other advantages of the invention, as discussed in connection with FIGS. 1 to 4. In FIG. 5, there is provided an outer fluid tank 49, containing a body of liquid 50 which is disposed about the outside of spherical tank 10a. A second body of liquid is contained within the interior of tank 10a, but is isolated from liquid 50. This FIG. 5 arrangement may typically be a missile tank structure, in which the outer liquid 50 is liquid nitrogen at a very low temperature, and in which the liquid in the inner sphere 10a is helium, which must be cooled very rapidly by the nitrogen as soon as the helium is pumped into sphere 10a.

To allow for this rapid transfer of heat through the wall of sphere 10a, I provide a series of heat conducting pins or elements 51, attached to the outer surface of liner 11a to be in direct heat conducting relation therewith, and extending radially through the outer reinforced resin layer 13a. At their outer ends, the pins may carry, or be attached to individual heat conducting elements 51a, of increased area transversely of the pin, which elements are in direct heat transferring contact over their entire outer surfaces with liquid 50. These enlarged area elements 51a are desirable in instances where the liquid 50 is of a nature such that the transfer of heat between the metal and the liquid is relatively inefficient, as where the liquid is at a temperature above its boiling point (for example nitrogen above its boiling point of −324° F.), in which case the heat transfer capabilities at the point of contact between the metal and liquid are substantially lowered by the boiling film coefficient. The conduction of heat through pins 15 themselves is of course much more efficient, so that the cross sectional area of the pins can be very small as compared with the exposed surface area of elements 51a. Except for the provision of pins 51 and elements 51a, the liner 11a and the outer layer 13a of sphere 10a in FIG. 5 may be substantially identical with the sphere of FIGS. 1 to 4.

Pins 51, which are typically of circular cross section, may be soldered or welded at their inner ends to metal liner 11a, and may initially be of a length to project radially outwardly through a distance greater than the thickness of outer layer 13a. After the resin has been cured, the outer end portions of the pins which project beyond the resinous layer may be filed off or otherwise removed down to the level of the outer surface of layer 13a, following which elements 51a can be rigidly secured to pins 51. These elements 51a may typically be small circular metal discs, of a diameter larger than pins 51, and extending transversely across the ends thereof and adjacent the surface of the resinous plastic material.

These discs may be soldered or welded to the pins, or otherwise secured thereto in direct best conducting relation. If weight-saving is of sufficient importance, these metal elements 51a may be applied by electro- or chemical-deposition plating, or metal spraying, or any practicable method of applying a non-structural but thermally (or, analogously, electrically) conductive film. These elements 51a may in some instances be of a non-circular outline shape, but regardless of their shape should preferably be conductively attached at their true centers to the terminal ends of the pins.

Preferably, the outer ends of pins 51, which initially project outwardly beyond the thickness of the resinous plastic material but are eventually removed, are rounded or pointed, so that during the filament winding process, whenever a filament engages one of the pins, the filament is deflected slightly by the rounded end of the pin and thus can move inwardly along the pin to a location at its side. Where the reinforcing strands are wound onto the liner in the form of a "roving," or ribbon, or other group of filaments, the individual pins may extend through this group where necessary, with some of the filaments being received on one side of a pin and others being received on the other side of the pin. In a preferred form of the invention, the pins 51, elements 51a and inner liner 13a are all formed of aluminum, to be both light in weight and highly heat conductive. Where the attainment of maximum heat conductivity is more important than the weight consideration, these conductive parts may be formed of copper, or in marginal applications these parts can even be formed of very thin silver.

FIG. 6 shows another variational form of pressure vessel 10b constructed in accordance with the invention, and which may be identical with vessel 10 of FIG. 1 except that between the two essentially hemispherical end sections 52 of the vessel there is inserted an intermediate essentially cylindrical section 53, to give the overall vessel the basic shape of a cylinder with hemispherical ends. The cylindrical section 53 has an inner corrugated liner 111b of metal or the like having waving corrugations of the same general type provided in the liners 11b of end sections 52 (but normally of uniform size and spacing along the entire length of section 53). The liner of central section 53 is welded to end sections 52 along two waving lines 54 to form a fluid tight inner liner structure. The outer reinforced resinous layer 13b is applied to the liner in the same manner discussed previously in connection with FIGS. 1 to 4. Vessel 10b of FIG. 6 may of course also have conductive pins and discs such as those shown at 51 and 51a in FIG. 6, if desired.

As has been mentioned previously, the actual amplitude of the corrugations in liner 11 of FIG. 2, or the corresponding liner of FIG. 5 or FIG. 6, is usually extremely small and almost imperceptible visually, the waves being shown in exaggerated form for purposes of illustration. Since the corrugations are of this slight amplitude, it will be understood that the resin which is carried by the filament 15 will normally tend to fill in the shallow valleys 24 in the liner during the filament winding operation, and will usually completely fill these valleys in a manner causing the resin to bond to liner 11 continuously over its entire surface.

I claim:

1. A hollow vessel for holding a fluid under pressure and defined by a wall including an inner liner of fluid impervious material and an outer layer of material extending about said liner and offering strength to resist rupture of the liner by internal pressure, said outer layer being formed of filament form reinforcing material embedded within a binder and extending about the liner to resist expansion thereof, said liner being deformed to alternately wave inwardly and outwardly relative to said filament form reinforcing material in a relation forming a series of elongated peaks and valleys on the liner, and the individual peaks and valleys having also a secondary waving configuration transversely of their lengths.

2. A hollow vessel as recited in claim 1, in which each of said individual peaks and valleys extends entirely about the liner.

3. A hollow vessel as recited in claim 1, in which said in and out waving configuration of the liner and said secondary waving configuration are both essentially sinusoidal.

4. A hollow vessel as recited in claim 1 in which said liner is formed of metal.

5. A hollow vessel as recited in claim 1, in which said binder is a resinous plastic material.

6. A hollow vessel as recited in claim 1 in which said filament form reinforcing material is glass.

7. A hollow vessel as recited in claim 1, in which said binder is bonded substantially continuously to the surface of said liner.

8. A hollow essentially spherical vessel as recited in claim 1, in which said in and out waving configuration of the liner and said secondary waving configuration are both essentially sinusoidal.

9. A hollow vessel for holding a fluid under pressure and defined by a wall including an inner liner of fluid impervious metal and an outer layer of material extending about said liner and offering strength to resist rupture of the liner by internal pressure, said outer layer being formed of filament form reinforcing glass embedded within a thermosetting resinous plastic binder and extending about the liner to resist expansion thereof, said liner being deformed to alternately wave inwardly and outwardly relative to said filament form reinforcing glass in a relation forming a series of elongated peaks and valleys on the liner, and the individual peaks and valleys having also a secondary waving configuration transversely of their lengths, said resinous plastic binder being bonded substantially continuously to the surface of said liner.

10. A hollow essentially spherical vessel for holding a fluid under pressure and defined by a wall including an inner liner of fluid impervious material and an outer layer of material extending about said liner and offering strength to resist rupture of the liner by internal pressure, said outer layer being formed of filament form reinforcing material embedded within a binder and extending about the liner to resist expansion thereof, said liner being deformed to alternately wave inwardly and outwardly relative to said filament form reinforcing material in a relation forming a series of elongated peaks and valleys on the liner, the individual peaks and valleys extending essentially annularly about the liner and progressively decreasing in length as they advance from an equator location toward two opposite pole locations, and the individual peaks and valleys having also a secondary waving configuration transversely of their lengths.

11. A hollow essentially spherical vessel as recited in claim 10, in which the pitch spacing between successive ones of said peaks progressively decreases toward said pole locations.

12. A hollow essentially spherical vessel as recited in claim 10, in which the amplitude of said in and out waving configuration of the liner, and of said secondary waving configuration, progressively decreases toward said pole locations.

13. A hollow vessel for holding a fluid under pressure and defined by a wall including an inner liner of fluid impervious material and an outer layer of material extending about said liner and offering strength to resist rupture of the liner by internal pressure, said liner being deformed to alternately wave inwardly and outwardly in a relation forming a series of elongated peaks and valleys on the liner, and the individual peaks and valleys having also a secondary waving configuration transversely of their lengths.

14. A hollow vessel as recited in claim 13, in which said liner is formed of metal.

15. A hollow vessel as recited in claim 13, in which said vessel is essentially spherical, the individual peaks and valleys extending essentially annularly about the liner and progressively decreasing in length and in wave amplitude as they advance from an equator location toward two opposite pole locations.

References Cited in the file of this patent

UNITED STATES PATENTS

| | | |
|---|---|---|
| 2,395,757 | Peters | Feb. 26, 1946 |
| 2,594,693 | Smith | Apr. 29, 1952 |
| 2,809,762 | Cardona | Oct. 15, 1957 |
| 2,827,195 | Kearns | Mar. 18, 1958 |
| 2,874,943 | Fennell | Feb. 24, 1959 |